United States Patent
Schu et al.

(10) Patent No.: US 8,565,313 B2
(45) Date of Patent: Oct. 22, 2013

(54) DETERMINING A VECTOR FIELD FOR AN INTERMEDIATE IMAGE

(75) Inventors: Markus Schu, Erding (DE); Peter Rieder, Munich (DE); Kilian Jacob, Munich (DE); Mark-Oliver Richter, Munich (DE); Karsten Roscher, Munich (DE)

(73) Assignee: Entropic Communications, Inc., San Diego, CA (US)

( * ) Notice: Subject to any disclaimer, the term of this patent is extended or adjusted under 35 U.S.C. 154(b) by 331 days.

(21) Appl. No.: 12/814,406

(22) Filed: Jun. 11, 2010

(65) Prior Publication Data
US 2010/0329346 A1 Dec. 30, 2010

(51) Int. Cl.
*H04N 7/26* (2006.01)

(52) U.S. Cl.
USPC .................. 375/240.16; 382/300; 348/416.1

(58) Field of Classification Search
None
See application file for complete search history.

(56) References Cited

U.S. PATENT DOCUMENTS

| | | | |
|---|---|---|---|
| 6,307,888 B1 * | 10/2001 | Le Clerc | 375/240.29 |
| 6,625,333 B1 | 9/2003 | Wang et al. | |
| 2003/0194151 A1 * | 10/2003 | Wang et al. | 382/300 |
| 2005/0135485 A1 * | 6/2005 | Nair et al. | 375/240.16 |
| 2009/0251612 A1 * | 10/2009 | Van Gurp | 348/614 |

FOREIGN PATENT DOCUMENTS

| | | |
|---|---|---|
| WO | 2005/027525 A1 | 3/2005 |
| WO | 2007/049209 A2 | 5/2007 |
| WO | 2007/119182 A2 | 10/2007 |

OTHER PUBLICATIONS

"Weighted-Adaptive Motion-Compensated Frame Rate Up-Conversion" Sung-Hee, IEEE, Aug. 2003.*

* cited by examiner

*Primary Examiner* — Christopher S Kelley
*Assistant Examiner* — Mohammed Jebari
(74) *Attorney, Agent, or Firm* — Bruce Greenhaus; Richard Bachand; Duane Morris LLP

(57) ABSTRACT

The invention relates to a method for generating a motion vector field for an intermediate image disposed between a first and a second image.

7 Claims, 1 Drawing Sheet

DETERMINING A VECTOR FIELD FOR AN INTERMEDIATE IMAGE

The present invention relates to a method for determining a motion vector fields for an intermediate image to be interpolated.

In the field of video signal processing, it is often desirable to generate a video image sequence having a higher image frequency from a video image sequence having a given image frequency. In an interpolation method having motion compensation, at least one intermediate image is interpolated for motion between two images of the input image sequence; that is, it is interpolated so that moving objects located at a first position in one image of the input image sequence and located at a second position in a subsequent image of the input image sequence are located at an intermediate position in the intermediate image, the relative location thereof based on the first and second position corresponding to the temporal position of the intermediate image based on the temporal position of the first and second images.

For the purpose of intermediate image interpolation, a known method is to divide the intermediate image into individual image blocks, and to determine a motion vector for each of the image blocks of the intermediate image to be interpolated, wherein the totality of the motion vectors of the intermediate image to be interpolated forms a motion vector field. The motion vector of an image block of the intermediate image to be interpolated contains information about which image blocks in the first and second image should be used for interpolating the image content of the image block of the intermediate image.

The individual motion vectors of the motion vector field of the intermediate image can fundamentally be determined in that the image contents of the first and second image are compared to each other block by block. For selecting the blocks in the first and second image that are compared to each other, there are different algorithms: In the so-called "full-search algorithm," all image blocks in the first and second image are compared to each other, which requires a great deal of computing resources; in a recursive estimation method, a block from the first image is compared only to selected blocks in the second image, wherein the positions of the blocks in the second image are specified by so-called test vectors or candidate vectors that are determined adaptively.

Problems in estimating motion can occur if no "counterpart" can be found in the second image for contents of individual image blocks in the first image. This is the case, for example, if a moving object changes its position between the first and second image such that it is still covered by another object in the first image and is therefore present only in the second image, or that it is present in the first image and recedes behind a second object in the second image. The first case is known as uncovering, and the second case is known as covering.

WO 2007/049209 A2 describes a method for determining a motion vector field for an intermediate image, in which the problems with uncovering and covering are avoided in that two vector fields are determined at first, namely a first vector field for the first image and a second vector field for the second image, and that subsequently six motion vectors from said two vector fields are selected for determining a motion vector for an image block of the intermediate image, wherein, in each case, one motion vector from the first image and one motion vector from the second image form a vector pair. A difference measure is then determined for each vector pair, representing a measure for a difference between the two vectors of a vector pair, and the vector pair having the smallest difference measure is selected using a median filter. The average value of the two vectors of the vector pair is then formed. Said average value is used as the motion vector for the image block of the intermediate image to be interpolated.

A median filter is a non-linear filter making a "hard" decision in favor of the vectors of a vector pair. Precisely when the individual difference measures differ only slightly, however, such a median filter can lead to incorrect decisions.

The object of the present invention is to provide a method for determining a motion vector field for an intermediate image to be interpolated that does not have the disadvantage described above.

The method according to the invention for generating a motion vector field for an intermediate image disposed between a first and a second image comprises providing a first motion vector field for the first image and a second motion vector field for the second image, and determining the motion vector field for the intermediate image using the first and the second motion vector fields, wherein each of the motion vector fields represents a number of different positions of the images, each associated with one motion vector. Determining a motion vector for a first position of the motion vector field of the intermediate image thereby comprises: determining a first vector pair from motion vectors having a first motion vector that depends on the motion vector of the first position of the first motion vector field, and a second motion vector that depends on the motion vector of the first position of the second motion vector field; determining a second vector pair from motion vectors having a third motion vector that depends on the motion vector at a second position in the first motion vector field, and having a fourth motion vector that depends on the motion vector at a third position in the second motion vector field, wherein the second position depends on the first position and the first motion vector, and the third position depends on the first position and the first motion vector; and determining a third vector pair of motion vectors, having a fifth motion vector that depends on the motion vector at a fourth position in the first motion vector field, and having a sixth motion vector that depends on the motion vector at a fifth position in the second motion vector field, wherein the fourth position depends on the first position and the second motion vector, and the fifth position depends on the first position and the second motion vector. The method further comprises determining a first difference measure representing a difference between the first and the second motion vector, a second difference measure representing a difference between the third and the fourth motion vector, and a third difference measure representing a difference between the fifth and the sixth motion vector, and mixing the first, second, third, fourth, fifth, and sixth motion vectors by weighting addition of the motion vectors, wherein weighting factors by which the individual motion vectors of a vector pair of motion vectors are to be multiplied depend on the difference measure of at least one of the other vector pairs of motion vectors.

In said method, a hard decision in favor of a single vector or in favor of a vector pair is avoided. Instead, the at least four selected motion vectors are mixed depending on the difference measures, which leads to a satisfactory result precisely when the individual difference measures differ only slightly.

In an example of the method, it is provided that the weighting factor of a motion vector of a vector pair depends on the reciprocal of the sum of the difference measures of all vector pairs, and depends on the difference measure of at least one other vector pair.

In a further example, it is provided that the weighting factors further depend on the relative position of the intermediate image to the first and the second image.

The present invention is explained in more detail below, in an example using figures. Said figures serve solely to illustrate the basic principle of the invention, so that only those features necessary for understanding said basic principle are shown. In the figures, the same reference numerals indicate the same features and the same meaning, unless noted otherwise.

Figure 1:
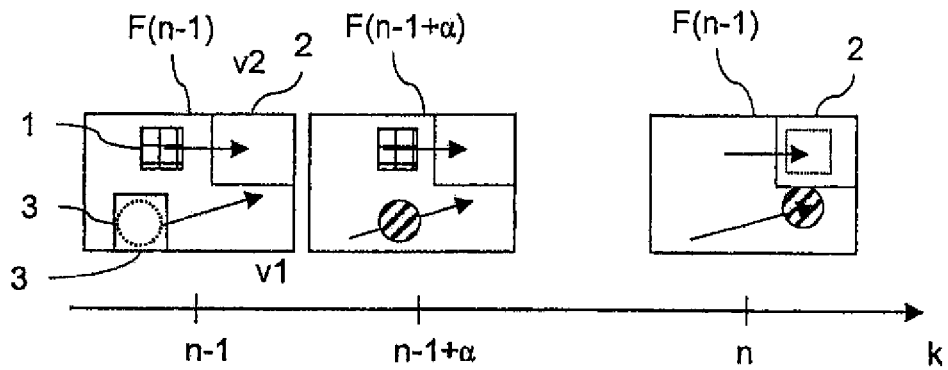
FIG. 1 illustrates the basic principle of an intermediate image interpolation method using schematically represented images of an image sequence.

FIG. 1 schematically illustrates the basic principle of an intermediate image interpolation method using an excerpt of a video image sequence. Two images $F(n-1)$, $F(n)$ of a video image sequence are shown, between which an intermediate image $F(n-1+\alpha)$ is to be interpolated. The two images $F(n-1)$, $F(n)$, between which the intermediate image $F(n-1+\alpha)$ is to be interpolated, are also referred to below as original images. Said original images can be arbitrary video images, and each comprise a number of picture elements arranged in a matrix in a manner not shown in more detail, each associated with one or more image information values (pixel values), such as one value each for the three primary colors red, green, and blue for an RGB image, or a luminance value (Y-value) and two chrominance values (U and V values) for a YUV image. The picture element matrix comprises, for example, 1920×1080 picture elements (pixels) in an HD image (HD=High Definition).

The intermediate image $F(n-1+\alpha)$ to be interpolated comprises a corresponding number of picture elements disposed in a matrix as the original images $F(n-1)$, $F(n)$, wherein the image information values of the individual picture elements are to be interpolated using the picture element information of the original images.

Said interpolation is to take place for motion, that is, a moving object located at a first position in the first image $F(n-1)$ and at a second position in the second image $F(n)$ is to be located at an intermediate position between the first position and the second position in the intermediate image $F(n-1+\alpha)$, wherein the relative location of the intermediate position to the first and the second position corresponds to the relative temporal position of the intermediate image $F(n-1+\alpha)$ based on the first and second images $F(n-1)$, $F(n)$. The relative temporal position of the intermediate image $F(n-1+\alpha)$ based on the first and second image $F(n-1)$, $F(n)$ is described by the parameter $\alpha$, where $0<\alpha<1$, also called the motion phase. For example, for $\alpha=0.5$, the intermediate image $F(n-1+\alpha)$ is centered temporally between the first and second image $F(n-1)$, $F(n)$. For a correct intermediate image interpolations, moving object in this case should be located at a position in the intermediate image $F(n-1+\alpha)$ located exactly in the center between the corresponding positions of said object in the first and second image $F(n-1)$, $F(n)$.

The intermediate image interpolation comprises subdividing the intermediate image to be interpolated into a number of image blocks, determining motion vectors for the individual image blocks, and interpolating the image content of an image block using image blocks in the first and second image $F(n-1)$, $F(n)$ considering the motion vector. The motion vector of an image block of the intermediate image to be interpolated contains information about which image block in the first image $F(n-1)$ and which image block in the second image $F(n)$ is selected for interpolating the image content of the image block of the intermediate image $F(n-1+\alpha)$.

Determining the motion vectors of the vector field of the intermediate image $F(n-1+\alpha)$ could take place by an image comparison of the first and second image $F(n-1)$, $F(n)$. Problems can occur, however, in such a "simple" motion estimation, if the content of individual blocks in one of the original images has no corresponding content in the other original image. This is the case, for example, if an object moves from a first position in the first image $F(n-1)$, where it is visible, to a second position in the second image $F(n)$, where it is covered by another object.

This scenario is shown in FIG. 1 using a moving object 1, located in front of a second object 2 in the first image $F(n-1)$ and located at a position in the second image $F(n)$ due to the motion thereof at which it is covered by the second object 2. The position of the first object 1 behind the second object is shown in dotted lines in FIG. 1 for better understanding. The arrow shown in connection with the first object indicates the direction of motion of the first object 1. If an object visible in an image is covered by another object in the next image, then this is called "covering". A similar phenomenon is known as "uncovering". In this case, an object appears from behind another object from one image to the next image. This is illustrated using FIG. 1 as well: a third object 3 is covered here in the first image $F(n-1)$ by a fourth object 4, from behind which it has emerged in the second image $F(n)$.

The method explained below permits reliable determination of the motion vector field of the intermediate image $F(n-1+\alpha)$ to be interpolated, even if covering and uncovering scenarios are present in the images of the image sequence.

In this method, it is first provided that a first motion vector field $D(n-1)$ is generated for the first image $F(n-1)$, and a second motion vector field $D(n)$ is generated for the second image $F(n)$. For determining said first and second motion vector fields, the first and second images $F(n-1)$, $F(n)$ are subdivided into a number of image blocks disposed in a matrix, such as image blocks having 8×8 pixels each, and a motion vector is determined for each of said image blocks. Determining said motion vectors for image blocks of the original images or the motion vector fields of the original images can be performed by means of any arbitrary known motion estimating method, so that further explanations thereof are not needed.

Determining the motion vector fields for the original images can be performed, for example, by a forward estimate. Here, an original image, such as the first original image $F(n-1)$, is compared to the temporally subsequent image, in the example, to the second image $F(n)$. Determining the motion vector field for the second image $F(n)$ in this case takes place by comparing to a further original image $F(n+1)$ (not shown). In a corresponding manner, the motion vectors for the first and second image can also be determined by means of a backward estimate. In this case, an image, such as the second image $F(n)$, is compared to the respectively previous original image, in the example, to the first image $F(n-1)$. The first image $F(n-1)$ is compared to a further previous image $F(n-2)$ (not shown) in this case, in order to determine a motion vector field for said first image $F(n-1)$.

In this context, it should be noted that the image information from more than two original images can be used for determining the motion vector fields for an original image.

In one example, for determining a motion vector field for the first image n−1, a backward estimate is performed using the previous image n−2 (not shown), and a forward estimate is performed using the subsequent image n. Both estimates lead to a vector field, whereby each image block of the first image n−1 is associated at first with two motion vectors, a first and a second motion vector. Using the two motion vectors associated with each image block of the first image after performing the backward and the forward estimate, a motion vector is then determined for each image block, resulting in the vector field of the first image n−1. Determining the one motion vector can be performed by selecting one of the first and second motion vectors, or by mixing the first and second motion vectors.

A selection criterion for a selection method can be, for example, a quality measure associated with each motion vector. Said quality measure is a measure of the difference between two image blocks, whose positions are defined by the motion vector in the two successive images. In such a selection method, for example, the vector having the "better" quality measure is selected as the motion vector, that is, the vector whose image blocks have the smaller difference.

Instead of selecting one of the two motion vectors determined by the two estimates, it is also possible to mix the two motion vectors, particularly considering the quality measures determined for the motion vectors. The motion vector having the "better quality measure" is thereby more heavily weighted than the other motion vector. The quality measures are selected so that they lie between 0 and 1 and become greater as the quality increases. For example, let g be the quality measure of the better of the two vectors. In this case, for example, a mixture is made in that the better of the two vectors is weighted by its quality measure g, and the other by 1−g.

In a corresponding manner, a motion vector field can be determined for the second image n, in that first a backward estimate is performed using the preceding image n−1, and a forward estimate is performed using the subsequent image n+1 (not shown). Both estimates lead to a vector field whereby each image block of the second image n is first associated with two motion vectors, of which subsequently one motion vector is formed for each image block by selecting or by mixing.

Figure 2:
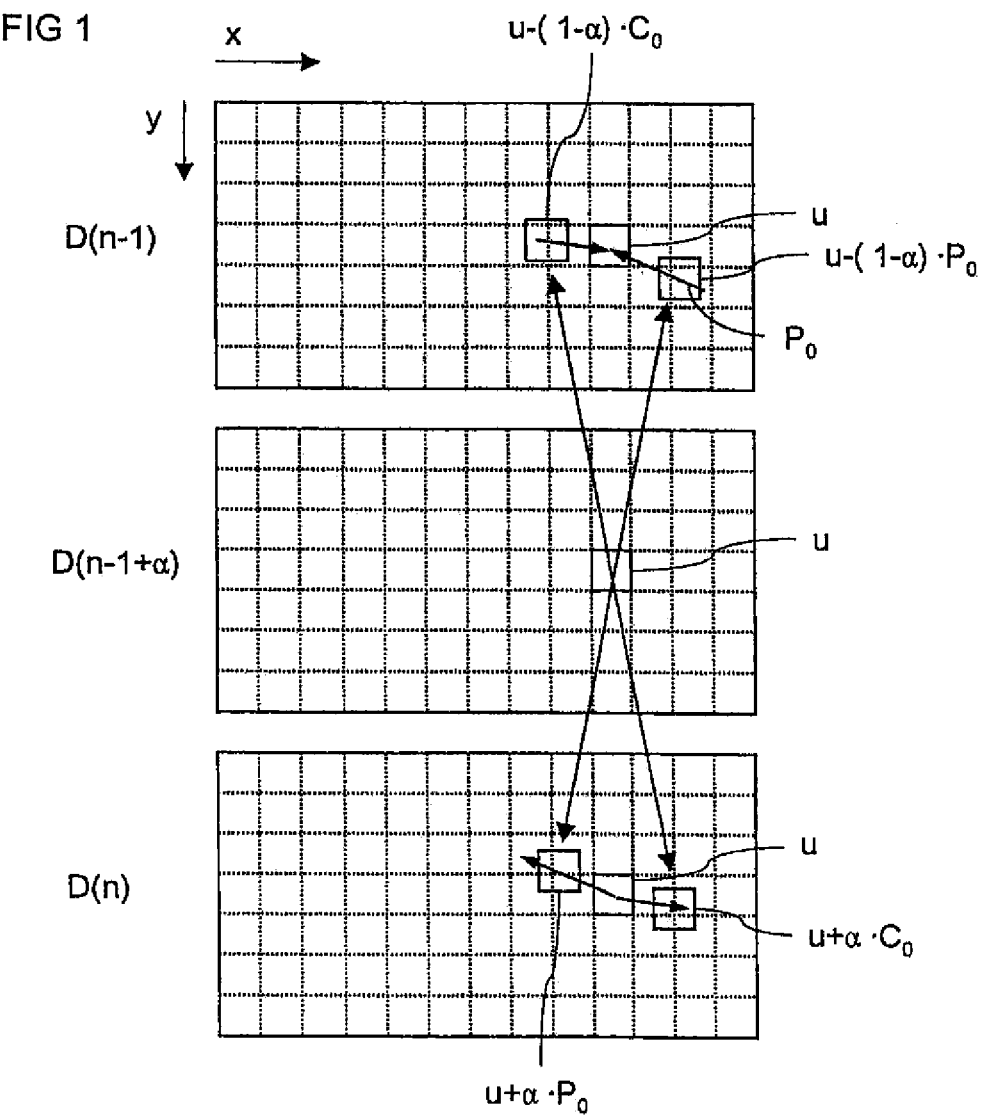
FIG. 2 illustrates an example of a method for generating a motion vector field for an intermediate image disposed between two images, using motion vector fields of the two images.

The first and second motion vector field D(n−1), D(n) are shown schematically in FIG. 2, using a matrix of image blocks associated with the individual motion vectors. The motion vectors, associated with the individual image blocks, of each motion vector field, however, are not shown in FIG. 2 for reasons of clarity. The motion vector field to be determined of the intermediate image to be interpolated is also shown schematically in FIG. 2. Each image block of the intermediate image to be interpolated thereby defines a position within the motion vector field. In said method, a motion vector is determined for each of said positions or image blocks. Said method is explained below for an image block or a position u of the motion vector field D(n−1+α) to be determined. u stands for a coordinate pair or a position vector within the block matrix, where $$u=(u_x,u_y) \quad (1),$$

where $u_x$ is a horizontal component, for example, and $u_y$ is a vertical component of the coordinate pair or position vector.

For individual motion vectors within the motion vector fields, the nomenclature D(k,w) is used below, where k is the temporal position of the image associated with the respective vector field, and w is the position or image block within the motion vector field associated with the motion vector. D(n−1+α, u) thus means, for example, the motion vector that is to be determined for the position u in the motion vector field D(n−1+α) of the intermediate image F(n−1+α) to be interpolated.

According to the method, at least three motion vector pairs are to be selected, of which one motion vector originates from the first motion vector field D(n−1), and one motion vector originates from the second motion vector field D(n). In an example, the first motion vector pair comprises a first motion vector $P_0$ and a second motion vector $C_0$, wherein the first motion vector $P_0$ depends on the motion vector at the first position u in the first motion vector field D(n−1), and the second motion vector $C_0$ depends on the motion vector at the position u in the second motion vector field (D(n). The first motion vector $P_0$ can particularly correspond to the motion vector of the first position u of the first motion vector field D(n−1), and the second motion vector $C_0$ can particularly correspond to the motion vector at the first position u of the second motion vector field D(n), so that:

$$P_0=D(n-1,u) \quad (2a),$$

$$C_0=D(n,u) \quad (2b).$$

The second vector pair comprises a third motion vector $P_1$ that depends on the motion vector at a second position u2 in the first motion vector field D(n−1) and a fourth motion vector $C_1$ that depends on the motion vector at a third position u3 in the second motion vector field D(n). The second position u2 in the first motion vector field D(n−1) thereby depends on the first position u and the first motion vector $P_0$, and the third position u3 in the second motion vector field D(n) depends on the first position u and the first motion vector $P_0$.

The second and third position u2, u3 can particularly also depend on the motion phase α. In one example, for the third and fourth motion vector $P_1$, $C_1$:

$$P_1=D(n-1,u2)=D(n-1,u-(1-\alpha)\cdot P_0) \quad (3a),$$

$$C1=D(n,u3)=D(n,u\alpha\cdot P_0) \quad (3b).$$

In this case, the second and third position u2, u3 depend on the first motion vector $P_0$ and the motion phase α.

The fourth vector pair comprises a fifth motion vector $P_2$ and a sixth motion vector $C_2$. The fifth motion vector thereby corresponds to the motion vector at a fourth position u4 in the first motion vector field D(n−1), and the sixth motion vector $C_2$ corresponds to the motion vector at a fifth position u5 in the second motion vector field D(n). The fourth position u4 thereby depends on the first position u and the second motion vector $C_0$, and optionally on the motion phase α. The fifth position u5 thereby depends on the first position u and the second motion vector $C_0$, and optionally on the motion phase α. In one example, for said motion vectors:

$$P_2=D(n-1,u4)=D(n-1,u-(1-\alpha)*C_0) \quad (4a),$$

$$C_2=D(n,u5)=D(n,u+\alpha*C_0) \quad (4b).$$

The method further provides for determining difference measures or distance measures for the motion vector pairs. The difference measure of a motion vector pair is thereby a measure for the difference or distance of the two vectors of a vector pair. A distance measure of the first motion vector pair is referred to in the following as the first distance measure $d_0$, and a distance measure for the second motion vector pair is referred to in the following as the second distance measure $d_1$. For said distance measures:

$$d_0=|P_0-C_0| \quad (5),$$

$$d_1=|P_1-C_1| \quad (6),$$

$$d_2=|P_2-C_2| \quad (7).$$

In this example, the distance measures $d_0$, $d_1$, $d_2$ are values of the difference vectors obtained by vector subtraction of the two vectors of a vector pair. In said context, it should be noted that instead of the values of the difference vectors, any other arbitrary distance metrics can be used for determining a difference or mutual deviation of a vector pair. For example, even-numbered powers of the individual components of the difference vectors could be calculated and the values thus obtained could be added together to obtain the difference measure.

In addition to said distance measures $d_0, d_1, d_2$ an overall distance measure is also calculated, where:

$$d=d_0+d_1+d_2 \quad (8).$$

In order to obtain the motion vector $P=D(n-1+\alpha, u)$ of the motion vector field $D(n-1+\alpha)$, the method further provides that the motion vectors of the at least three vector pairs are mixed, in that the individual motion vectors are weighted and added together. The weighting factors of the individual motion vectors of a motion vector pair thereby depend on the distance measure of the other two motion vector pairs, such that the motion vectors of a motion vector pair are weighted less, the greater the distance measure of said motion vector pair is in comparison to the distance measure of the other two motion vector pairs. In one example, the motion vector D of the image block u in the motion vector field $D(n-1+\alpha)$ is determined as follows:

$$P = \frac{P_0 + C_0}{2} \cdot \frac{d_1 + d_2}{2d} + \frac{P_1 + C_1}{2} \cdot \frac{d_0 + d_2}{2d} + \frac{P_2 + C_2}{2} \cdot \frac{d_0 + d_1}{2d}. \quad (9)$$

As can be observed directly, for example, the first and second motion vectors $P_0$ and $C_0$ are weighted particularly little, by a weighting factor $(d_1+d_2)/2$, if the distance measures $d_1, d_2$ determined for the first and second motion vector pairs are small in comparison to the overall distance measure d, and are therefore small in comparison to the distance measure $d_0$ of the first vector pair. Conversely, the motion vectors of a motion vector pair are weighted more heavily, the lesser the distance measure is for said motion vector pair.

In a further example, when determining the motion vector P, the motion phases are also determined in addition to the distance measures of the individual motion vector pairs, such that the motion vectors of a motion vector field of an original image are weighted more heavily, the closer the intermediate image to be interpolated lies to the original image, or the lesser the relative distance of the original image to the intermediate image in comparison to the distance between the intermediate image and the other original image. In this case, for example, the motion vector P is determined considering the motion phase $\alpha$, according to $$P = [P_0 \cdot (1-\alpha) + C_0 \cdot \alpha] \frac{d_1 + d_2}{2d} + [P_1 \cdot (1-\alpha) + C_1 \cdot \alpha] \quad (11)$$
$$\frac{d_0 + d_2}{2d} + [P_2 \cdot (1-\alpha) + C_2 \cdot \alpha] \frac{d_1 + d_2}{2d}.$$

The invention claimed is:

1. A method for generating a motion vector field for an intermediate image disposed between a first and a second image, the steps of the method being performed in a video processor, comprising:
    providing a first motion vector field for the first image and a second motion vector field for the second image, and determining the motion vector field for the intermediate image using the first and the second motion vector field, wherein each of the motion vector fields represents a number of different positions of picture elements in the images, each associated with a motion vector; and
    determining a motion vector at a first position of the motion vector field of the intermediate image by:
    determining a first vector pair of motion vectors having a first motion vector (Po) that depends on the motion vector of the first position of the first motion vector field, and a second motion vector that depends on the motion vector of the first position of the second motion vector field;
    determining a second vector pair of motion vectors having a third motion vector, which depends on the motion vector at a second position in the first motion vector field, and having a fourth motion vector, which depends on the motion vector at a third position in the second motion vector field, wherein the second position depends on the first position and the first motion vector, and the third position depends on the first position and the first motion vector;
    determining a third vector pair of motion vectors having a fifth motion vector, which depends on the motion vector at a fourth position in the first motion vector field, and having a sixth motion vector which depends on the motion vector at a fifth position in the second motion vector field, wherein the fourth position depends on the first position and the second motion vector, and the fifth position depends on the first position and the second motion vector;
    determining a first difference measure that represents a difference between the first and the second motion vector, a second difference measure, that represents a difference between the third and the fourth motion vector, and a third difference measure, that represents a difference between the fifth and the sixth motion vector;
    mixing the first, second, third, fourth, fifth, and sixth motion vectors by a weighted addition of the motion vectors, wherein weighting factors by which the individual motion vectors of a vector pair of motion vectors are multiplied depend on a quality factor, g, based on the difference measure of at least one of the other vector pairs of motion vectors, and wherein the motion vector having a better quality factor is multiplied by g and the other motion vector is multiplied by 1−g.

2. The method according to claim 1, in which the second position depends on the first position, the first motion vector, and a relative position of the intermediate image to the first and second image, and
    in which the third position depends on the first position, the first motion vector, and a relative position of the intermediate image to the first and second image.

3. The method according to claim 2, in which, for the second position:

$$u2=u-(1-\alpha)Po$$

and in which, for the third position:

$$u3=\mu+Po$$

wherein μ stands for the first position, u2 the second position, u3 the third position, Po for one of the first and second motion vectors, and α for the relative position of the intermediate image to the first and second image.

4. The method according to claim 3, in which the fourth position depends on the first position, the other of the first and second motion vectors, and a relative position of the intermediate image to the first and second image, and
    in which the fifth position depends on the first position, the other of the first and second motion vectors, and a relative position of the intermediate image to the first and second image.

5. The method according to claim 4, in which, for the fourth position:

$$u4=\mu(1-\alpha)Co$$

and in which, for the fifth position:

$$u5=\mu+\alpha Co$$

wherein μ stands for the first position, u4 the fourth position, u5 the fifth position, Co for the other of the first and second motion vectors, and α for the relative position of the intermediate image to the first and second image.

6. The method according to claim 5, in which the weighting factor of a motion vector of a vector pair depends on the reciprocal of the sum of the difference measures of all vector pairs, and depends on the difference measure of at least one other vector pair.

7. The method according to claim 6, in which the weighting factor also depends on the relative position of the intermediate image to the first and second image.

\* \* \* \* \*